H. RYDER.
PNEUMATIC TIRE.
APPLICATION FILED NOV. 12, 1920.
1,392,853.
Patented Oct. 4, 1921.
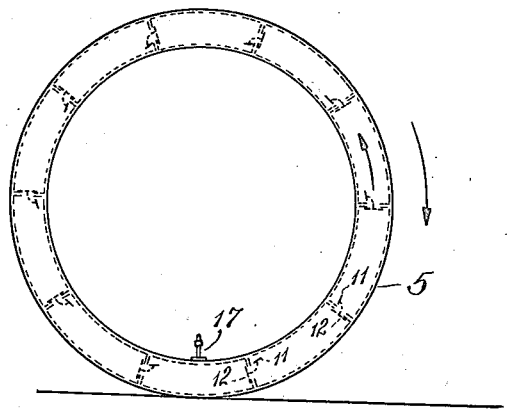
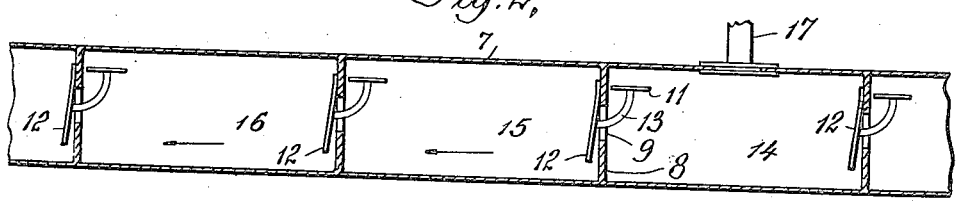
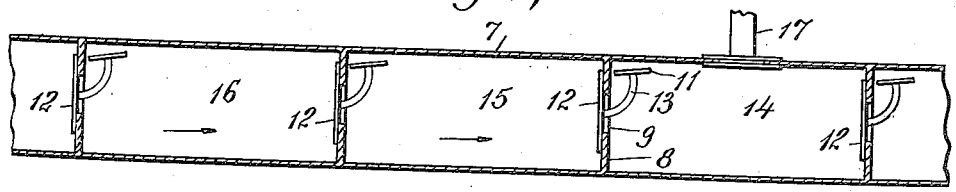
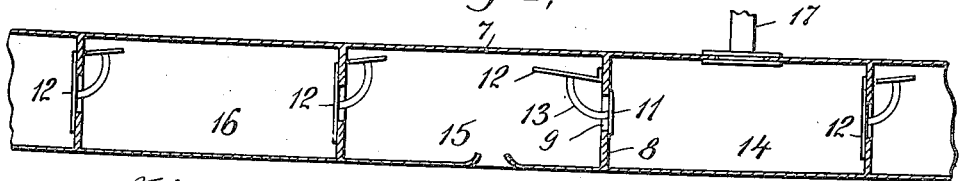
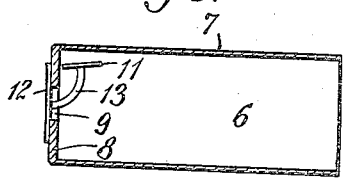
Inventor
Henry Ryder
By his Attorneys
Pennie, Davis, Marvin & Edmonds

UNITED STATES PATENT OFFICE.

HENRY RYDER, OF NEW YORK, N. Y.

PNEUMATIC TIRE.

1,392,853.     Specification of Letters Patent.     Patented Oct. 4, 1921.

Application filed November 12, 1920. Serial No. 423,519.

*To all whom it may concern:*

Be it known that I, HENRY RYDER, a citizen of the United States, residing at New York, in the county of New York, State of New York, have invented certain new and useful Improvements in Pneumatic Tires; and I do hereby declare the following to be a full, clear, and exact description of the invention, such as will enable others skilled in the art to which it appertains to make and use the same.

This invention relates to a pneumatic tire or a tube for a pneumatic tire provided with chambers or compartments which under certain conditions are closed to the passage of air from one to the other and which under other conditions will allow air to pass from one to the other.

An important object of the invention is to provide a pneumatic tire or tube for a pneumatic tire which is provided with a number of separate air chambers so designed that all the chambers may be inflated from one point, and yet one in which the escape of air in the event of a puncture is localized to the particular chamber in which the puncture takes place.

Another object of the invention is to provide a chambered tire which may be inflated from a single point, and yet so arranged that the air on the inside of the tire is prevented from circulating around on the inside of the tire when the tire is in normal use. With the ordinary type of pneumatic tire or pneumatic tube the part in contact with the ground is more or less deformed, this deformation causing movement of the air within the tire in a direction opposite to the direction of rotation. This movement of the air causes considerable friction between the air and the inside of the tire and between the individual molecules of the air itself, both of which result in heating of the tire, a phenomenon which is well known and which is detrimental to the life of the tire and therefore to be avoided. The chambered tire built in accordance with my invention eliminates this cause of heating and yet permits inflation of the tire from one point.

The tire or tube according to this invention is provided with a series of transverse partitions at intervals along the length of the tire or tube to form a number of air chambers. Each partition is provided with an aperture and a pair of valve flaps is operatively associated with each aperture. One of the valve flaps is hinged to the partition and is provided with a curved arm passing through the aperture. The other valve flap is carried on the other end of this arm so that either one flap or the other may, under certain conditions, operate to close the aperture. An important feature of the valve construction is that the arm connecting the valve flaps is arranged to keep the flaps at an angle of a little more than 90° with respect to each other.

Other objects and advantages of the invention will appear from the following description taken in connection with the accompanying drawings, in which Figure 1 is a sectional view of an improved chambered tube, shown as traveling to the right; Fig. 2 is a sectional view on an enlarged scale showing the chambers and associated valves during inflation of the tire; Fig. 3 is a similar view showing the valves in normal position; Fig. 4 shows the positions assumed by the valves in case of a puncture of one chamber; and Fig. 5 shows one of the cup shaped units of which the tire is built.

The pneumatic tire or pneumatic tube indicated at 5 is formed of a number of cup shaped units 6, each unit comprising the cylindrical wall 7 and the end wall 8. Each end wall is provided with an aperture 9. A valve flap 12 is hinged on the left side of the partition 8 adjacent the aperture 9 so as to open and close the aperture. Flap 12 is provided with a rigid curved arm 13 extending to the right through the aperture; on the end of arm 13 and on the right side of the partition 8 is another valve flap 11, preferably made smaller than flap 12, the arm 13 being of a length and shape such that the valve flap 11 may also be moved to close aperture 9. The arm 13 is of the length sufficient to keep the angle between the valve flaps a little over 90°, and it is important for efficient operation of the valves that this angle be slightly greater than 90°.

The complete tire or tube is built up of a number of units 6 by vulcanizing the open end of one unit to the closed end of the adjacent unit, thereby forming a number of air chambers, indicated at 14, 15 and 16. Such chambers could, of course, be formed in other ways, but I have found this method to be a practical one for so doing. One of the chambers, such as 14, is provided with an inlet valve 17 of any well known type.

The valve flaps 12, preferably made of some such flexible material as leather, rubber or canvas, are so mounted on the walls 8 so as to normally assume the positions shown in Fig. 3. Such valve flaps are possessed of a small amount of resiliency which tends to keep the valve flaps in the position shown in Fig. 3, which is the normal position. The resiliency of the flaps is sufficient to prevent the closing of the apertures 9, which might result from the effect of gravity on the valve flaps when the valves are in the position shown at the right hand side of Fig. 1.

When the tire is being inflated from the valve 17 the air passes from chamber to chamber successively to the left, as shown in the drawings, all the way around the tire so that each chamber is brought to the full air pressure. During such inflation the passage of air through the aperture 9 would press the valve flap 12 a short distance to the left, but not enough to bring the other flap near the closing position. After the tire is inflated the valves will assume substantially the position shown in Fig. 3.

Fig. 4 shows the position that would be assumed by the valves in the event of a puncture of the chamber 15. The escape of the air through the puncture would immediately bring the pressure in that chamber to atmospheric, and there would be a tendency for the air in the chambers 14 and 16 to rush into the punctured chamber. Such a rush of air from the chambers 14 and 16 would promptly bring the valve flaps to the position shown in Fig. 4 to thereby localize the escape of air from the tire to the chamber 15, the other chambers remaining at substantially their original pressure. As the air rushes into the chamber 15 from the adjacent chambers it pushes the valve flaps that are in that chamber inwardly of the chamber to thereby pull the adjacent valve flaps into the path of onrushing air which catches them and snaps them to the closed position as shown in Fig. 4. The air pressure holds these valves closed and so further escape of air is prevented. With only one chamber of the tire deflated the motorist would still be able to travel some distance and would not be left practically helpless as would be the case with an absolutely flat tire.

The tube is mounted in its shoe so that the air in the tire, which as has been explained tends to move on the inside of the tire in a direction opposite to the direction of rotation of the tire, tends to shut the valve flaps 12. In Fig. 1 the tube or tire is shown as moving to the right and rotating to the right; the air in the tire tends to move to the left or counterclockwise. In Fig. 3 the air in the tire tends to move to the right, as indicated by the arrows; such movement does not take place, however, being checked by the closed valves.

In addition to the advantage of having a chambered tire inflatable from one point, a tire according to my invention also prevents the heating of the tire due to the movement of air around the inside of the tire with resulting friction of air against the inside wall of the tire and resulting friction between the individual particles of air.

It should be understood that the essential features of the invention may be carried out in other ways than in the specific embodiment here shown.

I claim:—

1. A tube for a pneumatic tire, comprising a plurality of air chambers separated by transverse partitions each provided with an aperture and a pair of valve flaps connected for simultaneous movement associated with each partition and aperture, whereby the tube may be inflated from one point and whereby loss of air is localized to the chamber in which a puncture takes place.

2. A pneumatic tire provided with a series of chambers separated from one another by partitions each of which is provided with a valve, each valve comprising two valve flaps, one of the valve flaps being hinged to one of the partitions, and an arm connecting the two valve flaps for simultaneous movement.

3. A pneumatic tire provided with a plurality of air chambers, apertured partitions separating the chambers, a valve flap on each side of the partitions for closing the aperture in that partition, and an arm connecting the valve flaps to maintain an angle of substantially 90° between them.

4. A pneumatic tire provided with a plurality of air chambers, apertured partitions separating the chambers, a valve flap on each side of each partition for closing the aperture in that partition, and an arm connecting the valve flaps to maintain an angle of little over 90° between them.

5. A tube for a pneumatic tire provided with a plurality of air chambers, apertured partitions separating the chambers, a valve flap hinged to each partition adjacent the aperture in that partition, an arm attached to said valve flap and extending through the aperture, and a second valve flap attached to the end of said arm for holding the two valve flaps at an angle of a little over 90° with respect to one another.

6. A chambered pneumatic tire or tube composed of a series of substantially cup-shaped elements, each of which is provided with an aperture in the bottom thereof, a valve flap on each side of the bottom of each of said cup-shaped elements for closing the aperture therein, and means connecting respective pairs of valve flaps for simultaneous movement.

7. A chambered pneumatic tire or tube composed of a series of cup-shaped elements, each provided with an aperture in the bottom thereof, a pair of valve flaps on opposite sides of the bottom of said elements adjacent the aperture, one of the flaps being hinged on one side of the bottom, and an arm connecting respective pairs of valve flaps for maintaining an angle of substantially 90° between them.

In testimony whereof I affix my signature.

HENRY RYDER.